United States Patent [19]
Wheeler

[11] Patent Number: 5,705,023
[45] Date of Patent: Jan. 6, 1998

[54] ADJUSTABLE RECAPPING RING

[76] Inventor: Loyde A. Wheeler, 22220 N. Madison Rd., Mead, Wash. 99021

[21] Appl. No.: 670,359

[22] Filed: Jun. 25, 1996

[51] Int. Cl.⁶ .................................................. B29D 30/56
[52] U.S. Cl. ...................... 156/394.1; 156/96; 156/909; 425/17
[58] Field of Search .................... 156/394.1, 909, 156/96, 420; 425/17, 20, 21, 27, 28.1, 36, 49, 51, 54, 58; 248/316.5; 49/330, 329, 339; 16/323, 293; 220/321, 287; 292/256.69

[56] References Cited

U.S. PATENT DOCUMENTS

| | | | |
|---|---|---|---|
| 1,898,742 | 2/1933 | Phillips | 292/256.69 |
| 1,924,578 | 8/1933 | Vick | 292/256.69 |
| 2,075,383 | 3/1937 | Vaughn | 220/321 |
| 2,245,533 | 6/1941 | Severy | 292/256.69 |
| 2,445,054 | 7/1948 | Baker | 18/18 |
| 2,447,035 | 8/1948 | Shell | 18/18 |
| 2,683,051 | 7/1954 | Christophersen | 292/256.69 |
| 2,703,188 | 3/1955 | Blanchette et al. | 292/256.69 |
| 2,848,745 | 8/1958 | Morris | 18/45 |
| 3,316,596 | 5/1967 | Robertson | 18/43 |
| 4,600,467 | 7/1986 | Perdue | 56/394.1 |
| 4,624,732 | 11/1986 | King | 156/394.1 |
| 4,808,256 | 2/1989 | Hill | 156/394.1 |
| 4,861,247 | 8/1989 | Schimanek | 425/11 |
| 5,151,150 | 9/1992 | Davis et al. | 156/348.1 |
| 5,297,444 | 3/1994 | Kriner et al. | 292/256.69 |

*Primary Examiner*—Geoffrey L. Knable
*Attorney, Agent, or Firm*—Wells, St. John, Roberts, Gregory & Matkin, P.S.

[57] ABSTRACT

An adjustable recapping ring includes a pivoted handle mounted to one end of a split ring. A rigid link is releasably connected between the handle and the remaining end section. The rigid link includes a rod pivotally mounted to the handle and an adjustable clevis releasably interconnected to a receiving slotted bracket on the remaining end section of the split ring. The clevis can be manually freed from the slotted bracket to effectively facilitate length such adjustments of ring diameter as required to accommodate specific tire bead dimensions.

5 Claims, 3 Drawing Sheets

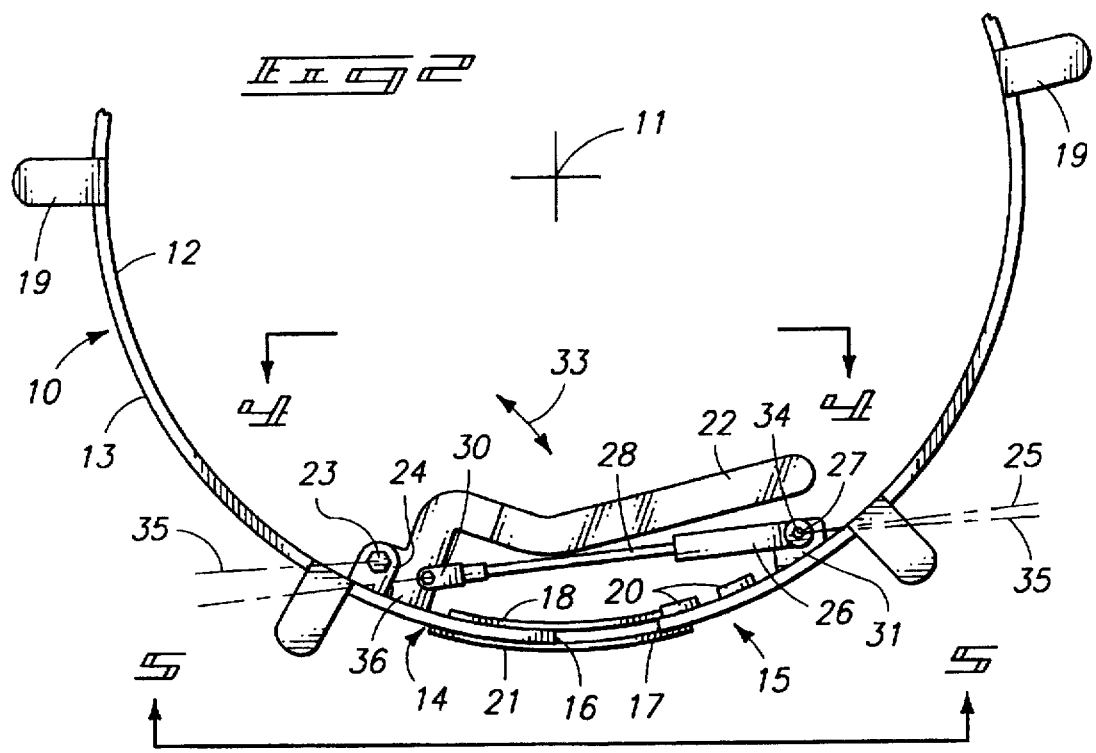
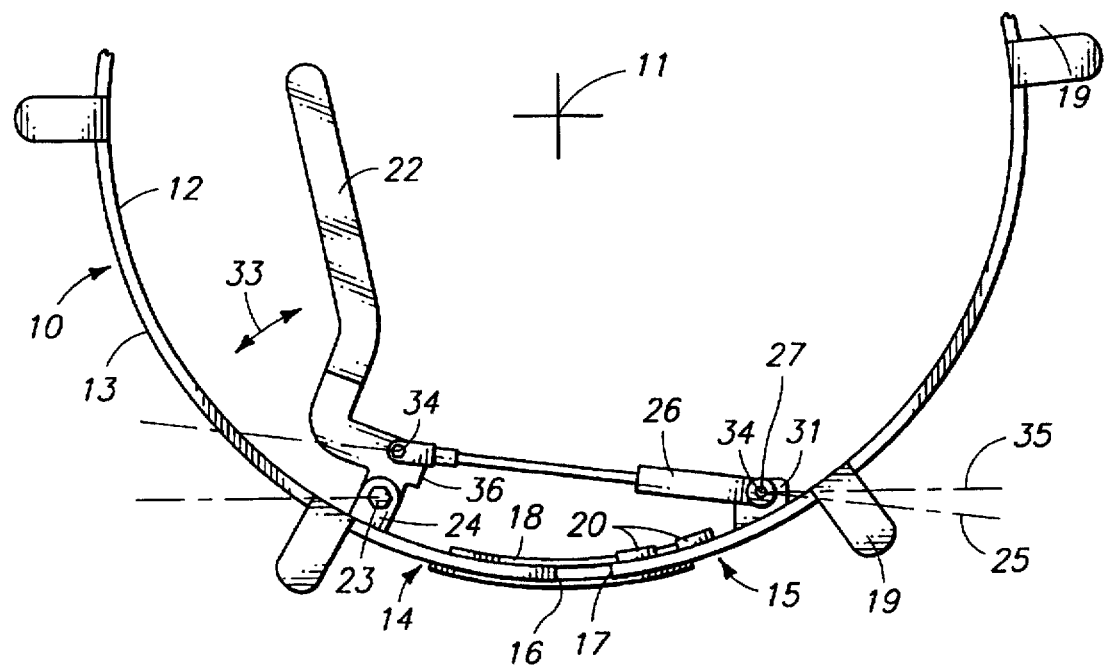

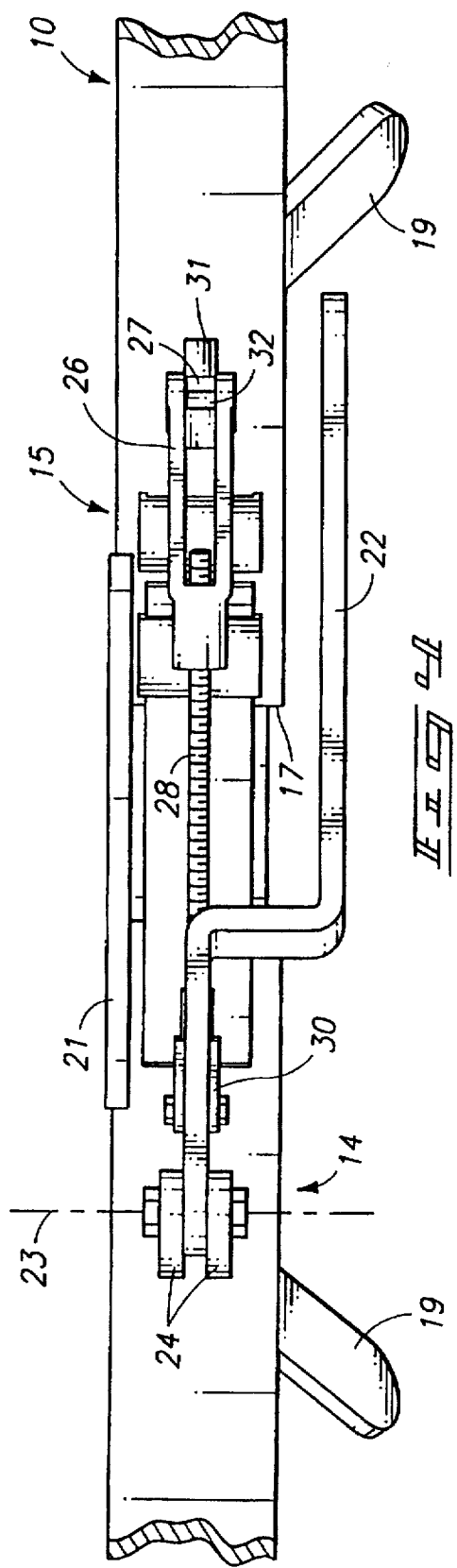
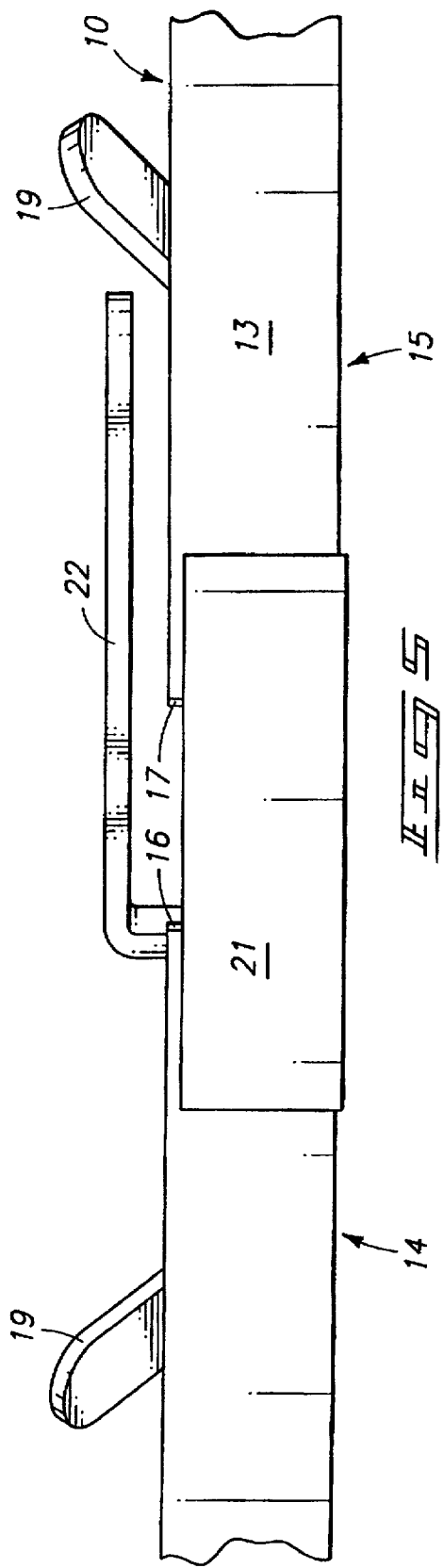

5,705,023

ADJUSTABLE RECAPPING RING

TECHNICAL FIELD

This invention relates to adjustable diameter recapping rings that press circumferentially outward against a bead of a tire as it is being retreaded.

BACKGROUND OF THE INVENTION

Various forms of sealing rings have been used in the recapping industry to seal a tire envelope to the bead of a tire that is being retreaded. The general operation of such recapping rings, as well as the background of such devices, is described in U.S. Pat. No. 4,624,732, issued on Nov. 25, 1986, which is hereby incorporated into this disclosure by reference.

While the rings shown in U.S. Pat. No. 4,624,732 are continuous and fixed in diameter, there have been various efforts made to provide adjustable diameter rings for this purpose. Examples are illustrated in U.S. Pat. No. 2,445,054, issued Jul. 13, 1948; U.S. Pat. No. 2,447,035, issued Aug. 17, 1948; U.S. Pat. No. 4,861,247, issued Aug. 29, 1989; and U.S. Pat. No. 5,151,150, issued Sep. 29, 1992.

The referenced U.S. Pat. No. 4,861,247 provides adjustable diameter by spreading the ring against a compressible spring block. U.S. Pat. Nos. 2,445,054 and 2,447,035 use a variable length turnbuckle for spreading and contracting purposes. U.S. Pat. No. 5,151,150 uses an adjustable turnbuckle pivotably interposed between a manual handle and a pivotal connection on a portion of a split ring.

The use of a turnbuckle for adjustment of such rings requires continuous connections between the ends of the turnbuckle and the members being adjusted. If one end of a turnbuckle is disconnected, it might turn along with the turnbuckle sleeve. Thus, turning of the sleeve results in movement between the elements to which the turnbuckle is connected. All frictional forces that resist such movement impede the turning of the sleeve and make such turning more difficult. Furthermore, since a turnbuckle usually involves threaded engagement of the sleeve at opposite ends, the turnbuckle structure itself presents substantial resistance to turning of the sleeve. Sleeve rotation is therefore relatively laborious and slow.

The present invention arose from an effort to provide effective adjustment of the diameter of recapping rings in a manner that can be accomplished quickly when such adjustment is required.

BRIEF DESCRIPTION OF THE DRAWINGS

Preferred embodiments of the invention are described below with reference to the following accompanying drawings.

FIG. 2 is a partial plan view of the recapping ring shown in FIG. 1, the ring being shown in its expanded condition;

FIG. 3 is a view similar to FIG. 2, showing the ring in a partially contracted condition;

FIG. 4 is an enlarged fragmentary view taken along line 4—4 in FIG. 2; and

FIG. 5 is an enlarged fragmentary view taken along line 5—5 in FIG. 2.

DETAILED DESCRIPTION OF THE PREFERRED EMBODIMENTS

Figure 1:
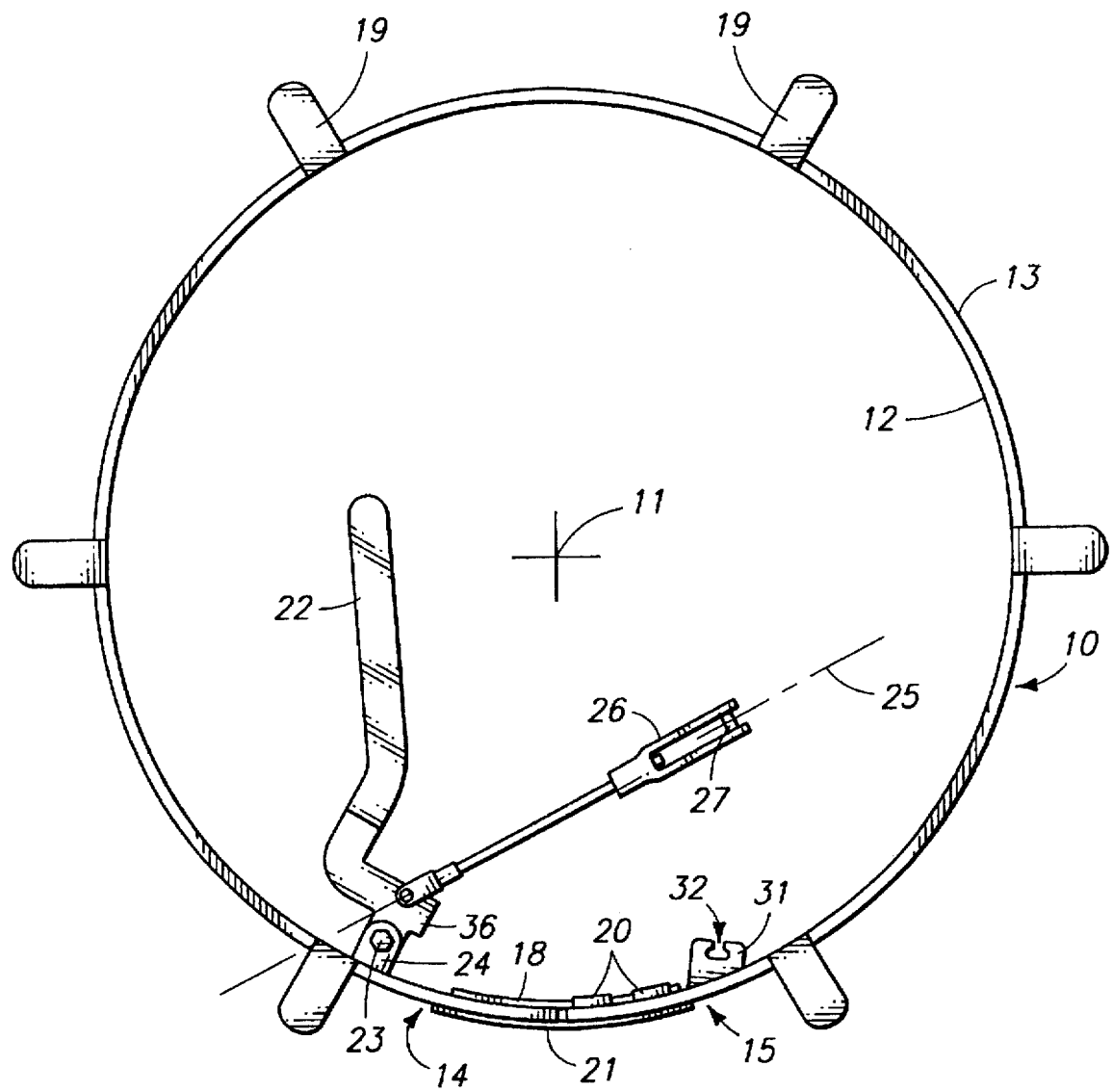
FIG. 1 is a plan view of a recapping ring constructed according to this disclosure.

This disclosure of the invention is submitted in furtherance of the constitutional purposes of the U.S. Patent Laws "to promote the progress of science and useful arts" (Article 1, Section 8).

The nature of the recapping ring and its use in the process of retreading a used tire carcass is fully described in U.S. Pat. No. 4,624,732, which has been incorporated into this disclosure by reference. The present adjustable recapping ring would be used in a matching pair that would be substituted in place of the fixed diameter ring assemblies illustrated and described in the referenced patent disclosure. Additional description of the recapping process and functions of a recapping ring are not believed to be necessary in order to provide a disclosure understandable to those skilled in the field of recapping or retreading tires.

The illustrated adjustable recapping ring is in the form of a radially split ring 10. Ring 10 is preformed in a cylindrical configuration and is centered about a transverse ring axis 11.

The illustrated ring 10 is capable of being used at either side of a tire. The ring 10 as shown in the drawings is a simple cylindrical ring having inner annular surfaces 12 and outer annular surfaces 13. Protruding guides 19 extend radially outward from the ring 10 and assist in locating it within the bead of a receiving tire (not shown).

If desired, ring 10 can be stepped across its width or can have a somewhat conical configuration that would provide a tapered outer diameter to seal against the bead of the tire. Such ring configurations are well known and are illustrated in the earlier patents listed in the "Background" section of this disclosure.

The split ring 10 has a pair of end sections generally designated by the reference numerals 14 and 15. Each end section 14, 15 is formed along the inner and outer annular surfaces 12, 13 that terminate across facing end edges 16 and 17, respectively (see FIGS. 4 and 5).

To maintain the end sections 14 and 15 in annular positions consistent with the cylindrical nature of the remainder of the split ring 10, a protruding guide plate 18 is welded or otherwise fixed to the inner annular surface 12 at end section 14. Guide plate 18 has a curvature substantially similar to that of the split ring 10 and protrudes beyond the adjacent end edge 16. It is slidably received under guide straps 20 that are welded or otherwise fixed to the inner annular surface 12 at the end section 15. Guide plate 18 is freely slidable under the guide straps 20, which maintain the ends of the split ring in proper alignment with one another regardless of its diameter with respect to axis 11.

To provide a continuous outer ring surface for engagement against a compressible tire bead, a thin rigid shield 21 is welded or otherwise fixed to the outer annular surface 13 at the end section 14 of split ring 10. Shield 21 protrudes beyond the end edge 17 and overlaps the outer annular surface 13 at end section 15 of the split ring 10.

One side edge of shield 21 is formed as a channel that wraps about the adjacent side edges of the end sections 14, 15 and overlaps a portion of their inner annular surfaces 12. Shield 21 has a curvature substantially similar to the curvature about the split ring 10. It additionally assists in maintaining the end sections 14 and 15 in proper cylindrical alignment with respect to one another.

In the preferred embodiment of this invention, the preformed diameter of split ring 10 is its contracted diameter, as illustrated in FIG. 1. However, while split ring 10 is normally made from steel or other somewhat elastic metal material, any inherent bias toward a particular diameter in the preformed ring is of little practical consequence with respect to use of the ring. Such bias is normally not capable of overcoming the frictional forces on the ring ends due to the interconnecting guides, shields and ring positioning elements.

A handle 22 is pivotally mounted to the inner annular surface 12 of one end section 14 about the ring 10. As shown, handle 22 is pivoted about a first pivot axis 23 (FIG. 4). Axis 23 is located along the center a bolt or shaft interconnecting a fixed bracket 24 on end section 14 and a protruding extension on handle 22. The first pivot axis 23 is transverse and parallel to the ring axis 11.

A rigid link is releasably arranged along a longitudinal axis 25 that extends between the remaining end section 15 of the split ring 10 and a location on the handle 22 that is radially displaced from the first pivot axis 23.

In the form of the invention shown in the drawings, the rigid link includes a first open ended clevis 26 mounting a clevis pin 27 across one end of the link. It also includes a threaded supporting rod 28 that carries a second open ended clevis 30 that is fixed to rod 28 at the remaining end of the link.

The first open ended clevis 26 is threadably interconnected to rod 28 along the longitudinal axis 25 for relative rotation between them. Such rotation selectively changes the effective length of the link between handle 22 and the remaining end section 15 of split ring 10.

A releasable connection is provided at one end of the link for selectively permitting one member within it to be rotated about the longitudinal axis 25 relative to the other member for changing the effective length of the link. In the illustrated form of the invention, this releasable connection is provided between clevis pin 27 and a transversely slotted bracket 31 that protrudes radially from and is fixed to the inner annular surface 12 at the remaining end section 15 of the split ring 10. The slotted bracket 31 selectively receives the clevis pin 27 and alternatively permits manual release of it to allow the clevis 26 to be manually rotated about longitudinal axis 25.

The released clevis is illustrated in FIG. 1. When clevis 27 is freed from slotted bracket 31, it can be manually spun with very little effort. Because the rigid link is not interconnected between two opposed elements, the clevis 27 is free to be manually spun about longitudinal axis 25 without any impeding frictional forces other than those presented by its threaded interconnection with rod 28. In practice it has been found that this provides easier manual access to the free clevis 26 and substantially facilitates minor length adjustments of the rigid link.

The slotted bracket 31 includes a transverse aperture 32 that selectively receives the clevis pin 27 when the rigid link is interconnected to the end section 15 of split ring 10. The illustrated aperture has a widened inner portion that is substantially wider, when viewed from the side of ring 10, than the diameter of clevis pin 27. This inner portion leads radially inward to an unobstructed central opening that is only slightly wider than such diameter.

The clevis pin 27 can be manually moved through the opening at the top of slotted bracket 31 and can be captured in the transverse aperture for engagement of the clevis pin 27 and the slotted bracket 31. Because the opening is centered, the clevis pin can move back and forth within the aperture and engage opposed spaced surfaces the aperture in response to pivotable movement of the handle 22 in either rotational direction about the first pivot axis 23, as indicated by double-ended arrow 33.

A pivotal connection is also provided at the remaining end of the link. It mounts the link about a second pivot axis 34 that is also parallel to the ring axis 11. The second pivot axis 34 extends along the center of a bolt or shaft interconnecting the illustrated second clevis 30 and handle 22 at a location radially displaced from the first pivot axis 23 of handle 22 on the split ring 10. In addition to permitting pivotal movement between the rigid link and the handle 22, the interconnection at the second pivot axis 34 prevents rotation of the second supporting link member—rod 28—about the longitudinal axis 25.

It is operationally important to maintain handle 22 in the position at which the split ring 10 is expanded during recapping or retreading of the tire. To accomplish this, the second pivot axis 34 has a range of motion about the first pivot axis 23 passing overcenter across a line (shown at 35) extending between the axis 23 and the clevis pin 27 when received within and engaging the slotted bracket 31. This relationship is illustrated in FIG. 2.

A protruding edge 36 on the handle 22 serves as a limiting stop that engages the inner annular surface 12 of split ring 10. It prevents further extension of handle 22 when the handle has been moved to the overcenter position shown in FIG. 2.

It is to be understood that the illustrated details of the rigid link that releasably interconnects handle 22 and end section 15 of the split ring 10 is only one of many different variations that are possible. For instance, the positions of the two clevises 26 and 30 might be reversed, and the releasable connection of the rigid link might be provided at handle 22 rather than at end section 15. Other forms of pivotal connections might also be incorporated within the structure of the rigid link in place of the illustrated clevis configurations. However, in all such variations, one member within the rigid link must be restrained against rotation about its longitudinal axis and the other must be selectively freed for such rotation to effect changes in the length of the link.

It also is to be recognized that one end of the rigid link does not have a fixed pivotal relationship to the member with which it is interconnected during use of the ring. Because the aperture 32 of bracket 31 has an inner portion wider than the diameter of the clevis pin 27, the clevis pin is pushed or pulled across the aperture in order to engage the slotted bracket 31 in response to expansion or contraction of the split ring 10. The enlargement of the inner portion of aperture 32, which is clearly illustrated in FIG. 1, maintains the releasable clevis pin 27 within the aperture during movement of handle 22 in either of its pivotal directions, while permitting ready manual release of the clevis 26 for adjustment purposes.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An adjustable recapping ring receivable within a tire for engaging the bead of a tire during retreading operations, the recapping ring comprising:

a split ring preformed in a cylindrical configuration and centered about a split ring axis, the split ring having a pair of end sections each formed along inner and outer annular surfaces that terminate across facing transverse end edges, and which are movable relative to each other along substantially aligned, and circumferentially disposed paths of travel, and wherein the split ring has contracted and expanded diameter conditions, and wherein in the contracted diameter condition the split ring has a sufficiently reduced diameter to permit inter-positioning of the split ring within the tire, and in the expanded diameter condition the split ring forcibly engages the bead of the tire;

a manually movable handle pivotally mounted to a radially protruding bracket which is fixed on the inner annular surface of one end section of the split ring about a first pivot axis which is parallel to the ring axis, and wherein the manually movable handle is movable along a given course of travel;

a rigid link releasably arranged along a longitudinal axis which extends between the remaining end section of the split ring and a location on the handle radially displaced from the first pivot axis, the rigid link including a first open ended clevis mounting a clevis pin across one end of the link, and a continuous threaded rod terminating in a second open ended clevis at the remaining end of the link, the first clevis being threadably interconnected to the continuous threaded rod along the longitudinal axis for relative rotation between them for selectively changing the effective length of the link between the handle and remaining end section of the split ring;

a transversely slotted bracket protruding radially from and fixed on the inner annular surface of the remaining end section of the split ring, the slotted bracket receiving the clevis pin at the one end of the link and permitting manual release of the clevis pin from within the slot to permit the first clevis to be manually rotated about the longitudinal axis relative to the continuous threaded rod for changing the effective length of the link; and a pivotal connection provided by a second clevis pin extending across the second clevis and matingly engaging the handle along a second pivot axis which is parallel to the ring axis, the second clevis being immovably secured on the continuous threaded rod, and the second clevis pin preventing rotation of the rod about the longitudinal axis, and wherein manual force applied to the handle causes the handle to move along its given course of travel, and wherein in the absence of force applied by the handle to the split ring, the split ring assumes the contracted diameter condition, and wherein force applied by the handle to the split ring causes the split ring to assume the expanded diameter condition, and wherein in the expanded diameter condition the outer annular surface of the split ring engages the bead of the tire.

2. The adjustable recapping ring of claim 1, wherein the second pivot axis has a range of motion about the first pivot axis passing overcenter across a line that extends between the first pivot axis and the clevis pin of the first open ended clevis when received within the slotted bracket.

3. The adjustable recapping ring of claim 1, wherein the second pivot axis has a range of motion about the first pivot axis passing overcenter across a line which extends between the first pivot axis and the clevis pin of the first open ended clevis when received within the slotted bracket; and a stop operatively provided between the handle and the one end section of the split ring, the stop limiting the overcenter extension of the second pivot axis.

4. The adjustable recapping ring of claim 1, wherein the slotted bracket includes a transverse aperture for selectively receiving the clevis pin at the one end of the link;

the transverse aperture of the slotted bracket having an inner portion that is substantially wider than the diameter of the clevis pin received within it and an unobstructed central opening that is only slightly wider than such diameter, whereby the clevis pin can be manually moved through the opening and can be captured within the transverse aperture for engagement of the clevis pin and the slotted bracket during pivotable motion of the handle in either rotational direction about the first pivot axis.

5. An adjustable recapping ring receivable within a tire for engaging the bead of a tire during retreading operations, the recapping ring comprising;

a split ring preformed in a cylindrical configuration and having inner and outer annular surfaces, and a split ring axis, the split ring further having a pair of end sections that terminate across facing transverse edges, and which are movable relative to each other along substantially aligned, and circumferentially disposed paths of travel, and wherein the split ring has contracted and expanded diameter conditions, and wherein in the contracted diameter condition the split ring has a sufficiently reduced diameter to permit inter-positioning of the split ring within the tire, and in the expanded diameter condition the split ring forcibly engages the bead of the tire;

a manually movable handle pivotally mounted to a radially protruding bracket which is fixed on the inner annular surface of one end section of the split ring about a first pivot axis, and wherein the manually moveable handle is moveable along a given course of travel;

a rigid link releasably arranged along a longitudinal axis which extends between the remaining end section of the split ring and a location on the handle radially displaced from the first pivotal axis, the rigid link including a continuous threaded rod having opposite ends, and wherein a first open ended clevis is immovably secured on the continuous threaded rod, the first open ended clevis further having a first clevis pin which extends across the first clevis and which pivotally engages the remaining end section of the split ring, and a second clevis which threadably mates which the remaining end of the continuous threaded rod, the second clevis mounting a second clevis pin, and wherein threadable rotation of the second clevis relative to the continuous threaded shaft effectively changes the length of the link between the handle and the remaining end section of the split ring; and a transverse slotted bracket borne by the handle, the transverse slotted bracket releasably receiving the second clevis pin to permit the second clevis to be released and rotated about the continuous threaded rod to effectively change the length of the link, and wherein manual force applied to the handle causes the handle to move along its given course of travel, and wherein in the absence of force applied to the handle through the continuous thread rod, the split ring assumes the contracted diameter condition, and wherein force applied by the handle through the threaded rod to the split ring causes the split ring to assume the expanded diameter condition, and wherein in the expanded diameter condition the outer annular surface of the split ring engages the bead of the tire.

* * * * *